(12) United States Patent
Liang

(10) Patent No.: US 10,799,927 B2
(45) Date of Patent: Oct. 13, 2020

(54) PET CAGE AND DEVICE AND METHOD FOR MANUFACTURING THE SAME

(71) Applicant: Hongkun Liang, Zhongshan (CN)

(72) Inventor: Hongkun Liang, Zhongshan (CN)

( * ) Notice: Subject to any disclaimer, the term of this patent is extended or adjusted under 35 U.S.C. 154(b) by 350 days.

(21) Appl. No.: 15/275,325

(22) Filed: Sep. 23, 2016

(65) Prior Publication Data

US 2018/0050376 A1 Feb. 22, 2018

(30) Foreign Application Priority Data

Aug. 20, 2016 (CN) .......................... 2016 1 0697186

(51) Int. Cl.
| | | |
|---|---|---|
| *B21F 15/04* | (2006.01) | |
| *B21D 7/03* | (2006.01) | |
| *B21F 27/12* | (2006.01) | |
| *B21F 1/06* | (2006.01) | |
| *A01K 1/02* | (2006.01) | |

(52) U.S. Cl.
CPC .............. *B21D 7/03* (2013.01); *A01K 1/0245* (2013.01); *B21F 1/06* (2013.01); *B21F 15/04* (2013.01); *B21F 27/12* (2013.01)

(58) Field of Classification Search
CPC .. B21F 1/06; B21F 15/02; B21F 15/04; B21F 23/00; B21F 27/005; B21F 27/12; B21F 27/125; B21F 27/14; B21D 7/02; B21D 7/03; B21D 7/085; B21D 11/10; B21D 11/125

See application file for complete search history.

(56) References Cited

U.S. PATENT DOCUMENTS

| | | | | |
|---|---|---|---|---|
| 781,597 A | * | 1/1905 | Glassco | .................. E04H 17/10 140/52 |
| 1,215,332 A | * | 2/1917 | Berg | ...................... B21D 11/12 72/294 |
| 1,713,964 A | * | 5/1929 | Hoff | ......................... B21F 1/06 140/104 |
| 2,109,724 A | * | 3/1938 | Genebach | ............... B21F 27/12 29/897.15 |
| 3,967,487 A | * | 7/1976 | Stout | .................... B21D 53/886 72/305 |
| 4,338,976 A | * | 7/1982 | Stevens | ................. E04H 17/268 140/12 |

(Continued)

FOREIGN PATENT DOCUMENTS

JP 56-117845 A * 9/1981 ............. B21F 27/00

*Primary Examiner* — Edward T Tolan
(74) *Attorney, Agent, or Firm* — Oliff PLC

(57) ABSTRACT

A pet cage, including: a first lateral part, a second lateral part including a horizontal rod, and a connecting structure. The connecting structure includes a plurality of vertical rods. Each vertical rod includes an end including a swivel hook. The swivel hook includes: a front section, a middle section, and a rear section. The first lateral part and the second lateral part are adjacent to each other, and the connecting structure is disposed therebetween to connect the first lateral part and the second lateral part. The plurality of vertical rods is disposed on the first lateral part. The swivel hook is disposed at the end of each vertical rod and adapted to encircle the horizontal rod of the second lateral part. The angle between the rear section and the vertical rod of the first lateral part is between 80° and 100°.

9 Claims, 11 Drawing Sheets

(56) References Cited

U.S. PATENT DOCUMENTS

| | | | |
|---|---|---|---|
| 5,040,573 A * | 8/1991 | Shepard | B21F 1/06 |
| | | | 140/104 |
| 5,724,851 A * | 3/1998 | Rivard | B21D 7/022 |
| | | | 140/104 |
| 5,915,424 A * | 6/1999 | Franks | H01B 13/01209 |
| | | | 140/92.1 |

* cited by examiner

PET CAGE AND DEVICE AND METHOD FOR MANUFACTURING THE SAME

CROSS-REFERENCE TO RELATED APPLICATIONS

Pursuant to 35 U.S.C. § 119 and the Paris Convention Treaty, this application claims the benefit of Chinese Patent Application No. 201610697186.X filed Aug. 20, 2016, the contents of which are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a pet cage, and a device and a method for manufacturing the same.

Description of the Related Art

A typical pet cage is formed by connecting a plurality of lateral parts including first lateral parts and second lateral parts. As shown in FIG. 12, ends of vertical rods 40 of the first lateral parts are bent into returning sections 80, and horizontal rods 50 of the second lateral parts pass through the gaps between the returning sections 80 and the vertical rods 40. However, the included angle between each returning section 80 and the corresponding vertical rod 40 is relatively small, and thus, the returning section 80 must have a relatively long length as so to allow the horizontal rod of the second lateral part to pass through. This increases the production cost. In addition, the space formed by the returning section 80 and the vertical rod 40 is not a round hole, so that the relative rotation between the first lateral part and the second lateral part is not smooth, which increases the assembly difficulty of the cage. Furthermore, the end of the returning section 80 may hurt pets.

SUMMARY OF THE INVENTION

In view of the above described problems, it is one objective of the invention to provide a pet cage that has simple structure, and is safe and reliable.

It is another objective of the invention to provide a device for manufacturing a pet cage. The device has simple structure and is convenient to operate.

It is still another objective of the invention to provide a method for manufacturing a pet cage that has simple process.

To achieve the above objective, in accordance with one embodiment of the invention, there is provided a pet cage. The pet cage comprises: a first lateral part, a second lateral part comprising a horizontal rod, and a connecting structure. The connecting structure comprises a plurality of vertical rods. Each vertical rod comprising an end comprises a swivel hook. And the swivel hook comprises: a front section, a middle section, and a rear section. The first lateral part and the second lateral part are adjacent to each other, and the connecting structure is disposed therebetween to connect the first lateral part and the second lateral part. The plurality of vertical rods is disposed on the first lateral part. The swivel hook is disposed at the end of each vertical rod and adapted to encircle the horizontal rod of the second lateral part. An angle between the rear section and the vertical rod of the first lateral part is between 80° and 100°.

In a class of this embodiment, the angle between the rear section and the vertical rod of the first lateral part is 90°.

In accordance with one embodiment of the invention, there is provided a device for manufacturing a pet cage. The device comprises: a frame, a sliding table, and a plurality of hook modeling platforms. Each hook modeling platform comprises: a table body, an imbedding groove, a boss, and an arc groove. The sliding table is slidably disposed on the frame and adapted to support a first lateral part of the pet cage. The hook modeling platforms are disposed on the frame. The table bodies are capable of supporting a horizontal rod of a second lateral part of the pet cage. The imbedding grooves are disposed on the table bodies respectively for receiving vertical rods of the first lateral part and enabling the vertical rods of the first lateral part to be beneath the horizontal rod of the second lateral part. Each table body protrudes to form the boss; and the arc groove is disposed on each boss and communicates with each imbedding groove. The arc groove is adapted to bend the vertical rod of the first lateral part to form a swivel hook encircling the horizontal rod of the second lateral part in the sliding process of the sliding table.

In a class of this embodiment, the swivel hook encircles the horizontal rod of the second lateral part and comprises: a front section, a middle section, and a rear section. An angle between the rear section and the vertical rod of the first lateral part is between 80° and 100°.

In a class of this embodiment, the angle between the rear section and the vertical rod of the first lateral part is 90°.

In a class of this embodiment, sliding rails are disposed on the frame; and the sliding table is provided with sliding grooves matching with the sliding rails.

In a class of this embodiment, the boss and the corresponding table body are integrated as a whole.

In accordance with one embodiment of the invention, there is provided a method for manufacturing a pet cage. The method comprises:

A) placing a first lateral part on a sliding table of a frame, and inserting vertical rods of the first lateral part in imbedding grooves of hook modeling platforms;

B) placing a second lateral part on table bodies of the hook modeling platforms and placing horizontal rods of the second lateral part above the vertical rods of the first lateral part;

C) starting a driving device to allow the sliding table to drive the first lateral part to move forward, during which, an end of each vertical rod of the first lateral part leans against and moves relative to an inner wall of an arc groove of each hook modeling platform, whereby bending the end of each vertical rod of the first lateral part to form a swivel hook encircling the horizontal rod of the second lateral part and connecting the first lateral part and the second lateral part; and D) disconnecting the driving device, allowing the sliding table to recede, and taking out connected first lateral part and second lateral part.

In a class of this embodiment, the swivel hook comprises: a front section, a middle section, and a rear section. The front section, the middle section, and the rear section encircle the horizontal rod of the second lateral part. In C), an angle between the rear section and the vertical rod of the first lateral part is 90°.

In a class of this embodiment, the method further comprises the following step before A): processing a curved guiding section at the end of each vertical rod of the first lateral part.

Advantages of the pet cage and the device and the method for manufacturing the same according to embodiments of the invention are summarized as follows:

1. The end of each of the vertical rods is provided with the swivel hook adapted to encircle the horizontal rod of the second lateral part. The swivel hook comprises: the front section, the middle section, and the rear section. The angle between the rear section of the swivel hook and the vertical rod of the first lateral part is between 80° and 100°. The swivel hook encircles the horizontal rod of the second lateral part, so that the first lateral part and the second lateral part are connected together. The connecting structure is much simpler, and the production cost is much cheaper. In addition, the angle between the rear section of the swivel hook and the vertical rod of the first lateral part is between 80° and 100°, which reduces the space between the swivel hook and the horizontal rod and makes the swivel hook a roughly circle so as to make the relative rotation between the second lateral part and the first lateral part smooth and enable the vertical rods of the first lateral part to encircle the horizontal rod of the second lateral part with much shorter length, which lowers the material cost and improves the good appearance of the pet cage. Finally, the relative position between the end of the rear section of the swivel hook and the vertical rod of the first lateral part is difficult to crack, thus avoiding hurting the pets and being safer and more reliable.

2. Each hook modeling platform comprises the table body capable of supporting a horizontal rod of the second lateral part of the pet cage. The table body is provided with the imbedding groove for accommodating the vertical rod of the first lateral part and enabling the vertical rod of the first lateral part to be beneath the horizontal rod of the second lateral part. Each table body protrudes to form the boss. The arc groove is disposed on each boss communicating the imbedding groove and is adapted to bend the vertical rod of the first lateral part to form the swivel hook in the sliding process of the sliding table. Thus, during the manufacturing process, the sliding table drives the first lateral part to move forward. The end of the vertical rod of the first lateral part leans against and moves relative to an inner wall of the arc groove, so that the end of the vertical rod is bent and deformed into the swivel hook encircling the horizontal rod of the second lateral part. The whole device has simple structure and is convenient to operate.

3. The method for manufacturing the pet cage has simple process, high production efficiency, and is easy to popularize.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a pet cage and a device and a method for manufacturing the same are described below. It should be noted that the following examples are intended to describe and not to limit the invention.

Figure 9:
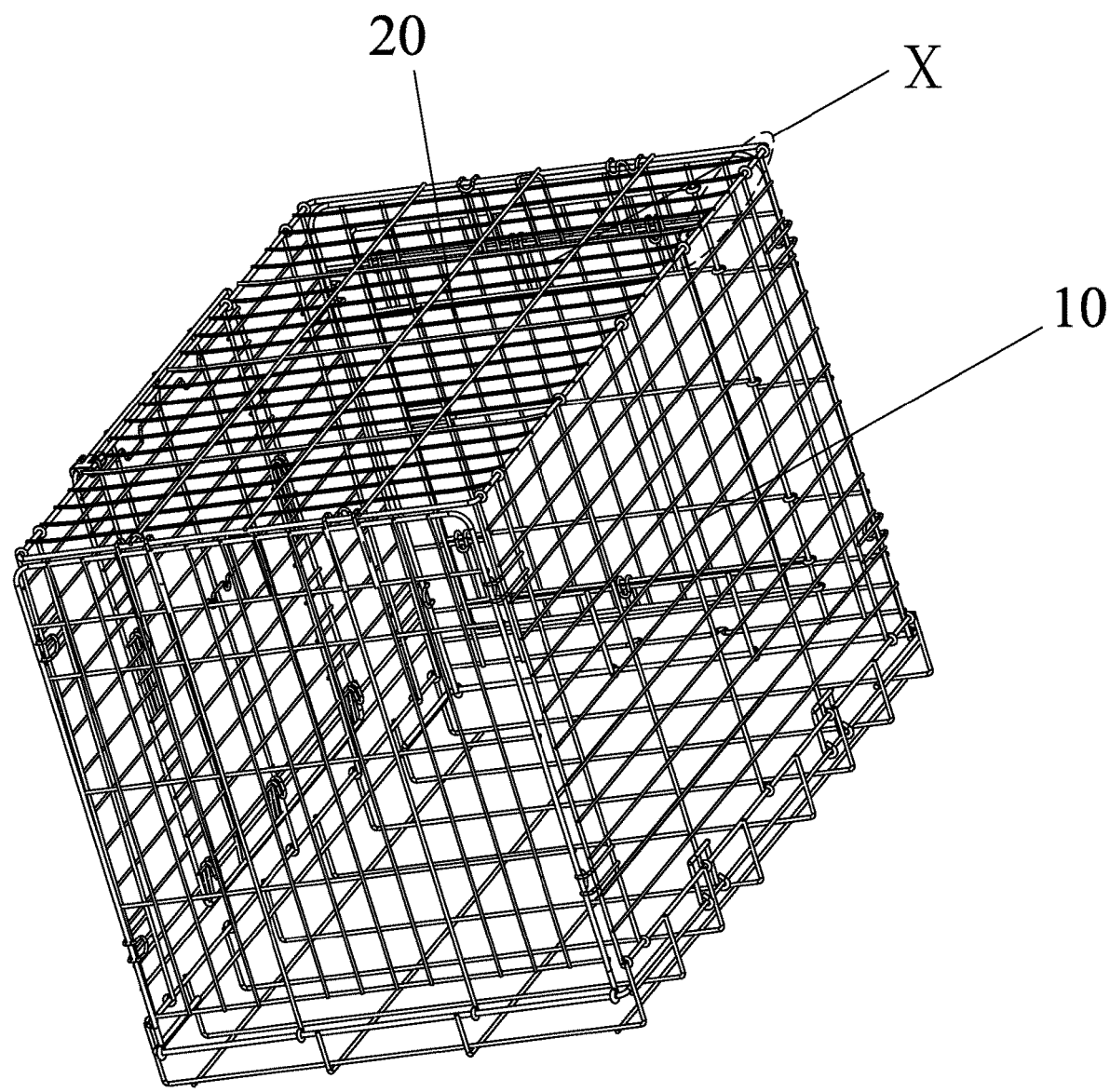
FIG. 9 is a stereogram of a pet cage in accordance with one embodiment of the invention.
Figure 10:
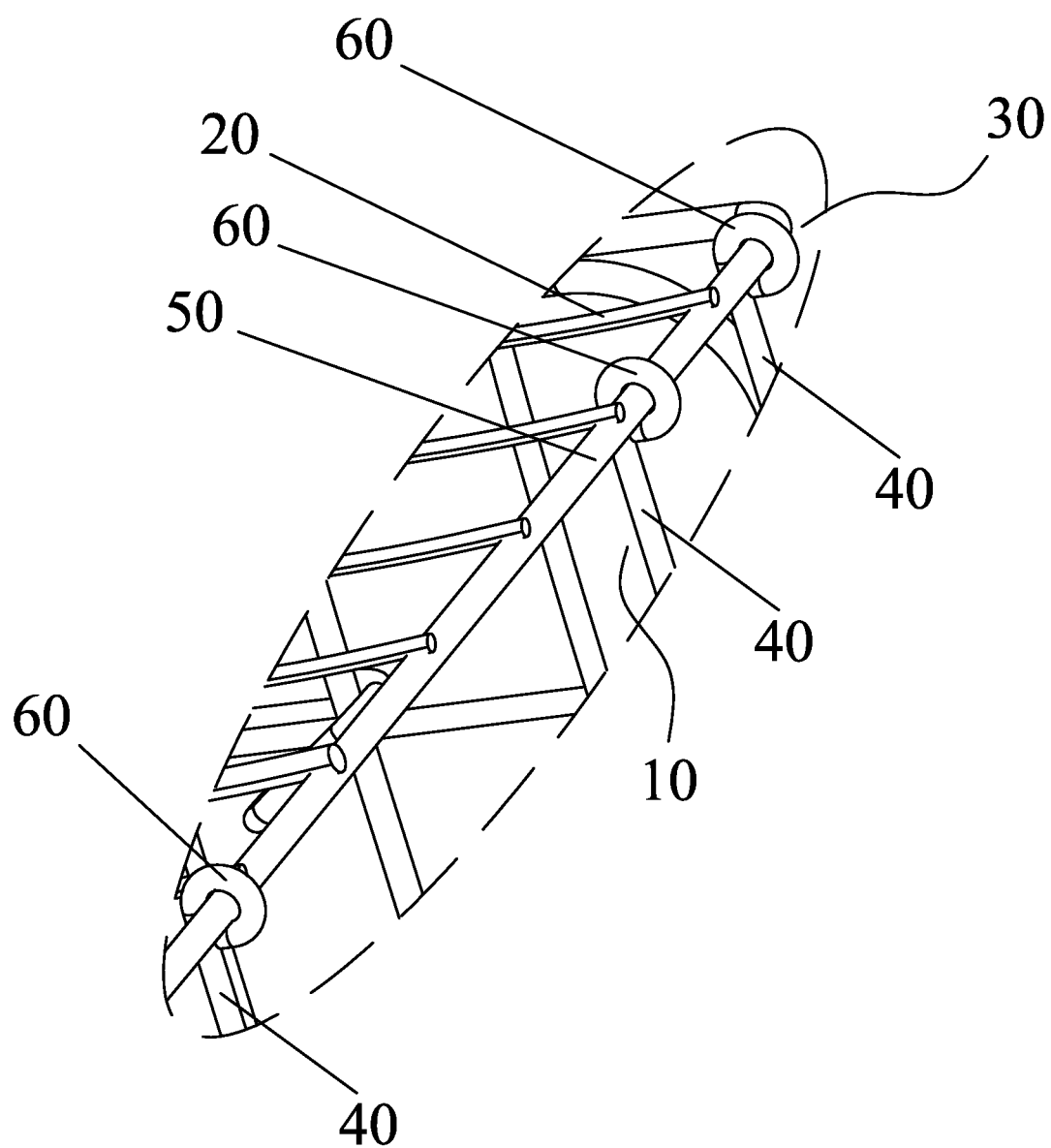
FIG. 10 is an enlarged view of part X of FIG. 9.
Figure 11:
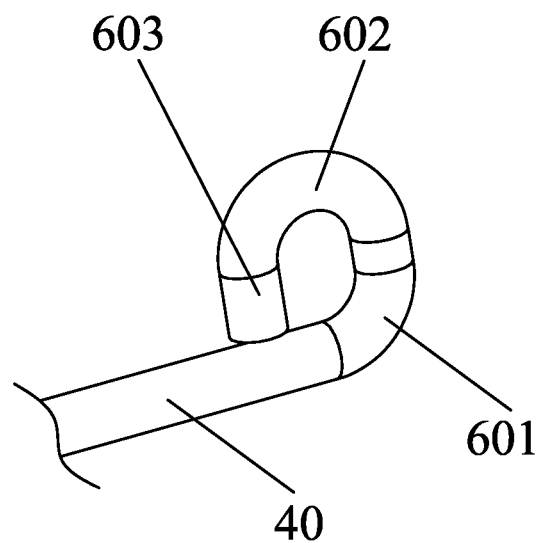
FIG. 11 is a stereogram of a swivel hook in accordance with one embodiment of the invention.
Figure 12:
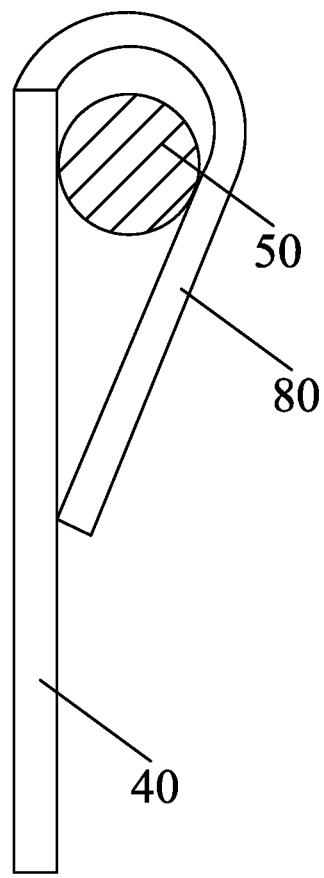
FIG. 12 is a structure diagram showing connection between a first lateral part and a second lateral part of a pet cage in the prior art.

As shown in FIGS. 9-11, a pet cage comprises a first lateral part 10 and a second lateral part 20. The first lateral part 10 and the second lateral part 20 are adjacent to each other, and a connecting structure 30 are disposed therebetween to connect the first lateral part 10 and the second lateral part 20. The connecting structure 30 comprises a plurality of vertical rods 40 disposed on the first lateral part 10. An end of each of the vertical rods 40 is provided with a swivel hook 60 adapted to encircle a horizontal rod 50 of the second lateral part 20. The swivel hook 60 comprises: a front section 601, a middle section 602, and a rear section 603. An angle between the rear section 603 of the swivel hook 60 and the vertical rod 40 of the first lateral part 10 is between 80° and 100°. The swivel hook 60 encircles the horizontal rod 50 of the second lateral part 20, so that the first lateral part 10 and the second lateral part 20 are connected together. The connecting structure is much simpler, and the production cost is much cheaper. In addition, the angle between the rear section 603 of the swivel hook 60 and the vertical rod 40 of the first lateral part 10 is between 80° and 100°, which reduces a space between the swivel hook 60 and the horizontal rod and makes the swivel hook 60 a roughly circle so as to make the relative rotation between the second lateral part 20 and the first lateral part 10 smooth and enable the vertical rods 40 of the first lateral part 10 to encircle the horizontal rod 50 of the second lateral part 20 with much shorter length, which lowers the material cost and improves the good appearance of the pet cage. Finally, the relative position between the end of the rear section 603 of the swivel hook 60 and the vertical rod 40 of the first lateral part 10 is difficult to crack, thus avoiding hurting the pets and being safer and more reliable.

The angle between the rear section 603 of the swivel rod 60 and the vertical rod 40 of the first lateral part 10 is 90°. The gap between the swivel rod 60 and the horizontal rod 50 is very small. The structure is much simpler and compacter, the material cost is reduced, and the production cost is correspondingly reduced. In the meanwhile, the rotation of the swivel hook 60 relative to the horizontal rod 50 of the second lateral part 20 is ensured, so that the first part 10 and the second part 20 can be rotated relative to each other and folded together, which makes the transportation of the components of the pet cage much convenient.

As shown in FIGS. 1-8, a device for manufacturing a pet cage comprises a frame 1 and a sliding table 2 that is slidably disposed on the frame 1 for placing a first lateral part 10 of the pet cage. A driving device 7 adapted to driving the sliding table 2 to slide optionally employs a cylinder or other driving structures. The frame 1 is further provided with a plurality of hook modeling platforms 3. Each hook modeling platform 3 comprises a table body 31 capable of supporting a horizontal rod 50 of a second lateral part 20 of the pet cage. The table body 31 is provided with an imbedding groove 32 for accommodating a vertical rod 40 of the first lateral part 10 and enabling the vertical rod 40 of the first lateral part 10 to be beneath the horizontal rod 50 of the second lateral part 20. Each table body 3l protrudes to form a boss 33. An arc groove 34 is disposed on each boss 33 communicating the imbedding groove 32 and is adapted to bend the vertical rod 40 of the first lateral part 10 to form a swivel hook 60 and allow the swivel hook 60 to encircle the horizontal rod 50 of the second lateral part 20 in a sliding process of the sliding table 2. Thus, during the manufacturing process, the sliding table 2 drives the first lateral part 10 to move forward. An end of the vertical rod 40 of the first lateral part 10 leans against and moves relative to an inner wall of the arc groove 34, so that the end of the vertical rod 40 is bent and deformed into the swivel hook 60 encircling the horizontal rod 50 of the second lateral part 20. The whole device has simple structure and is convenient to operate.

Figure 8:
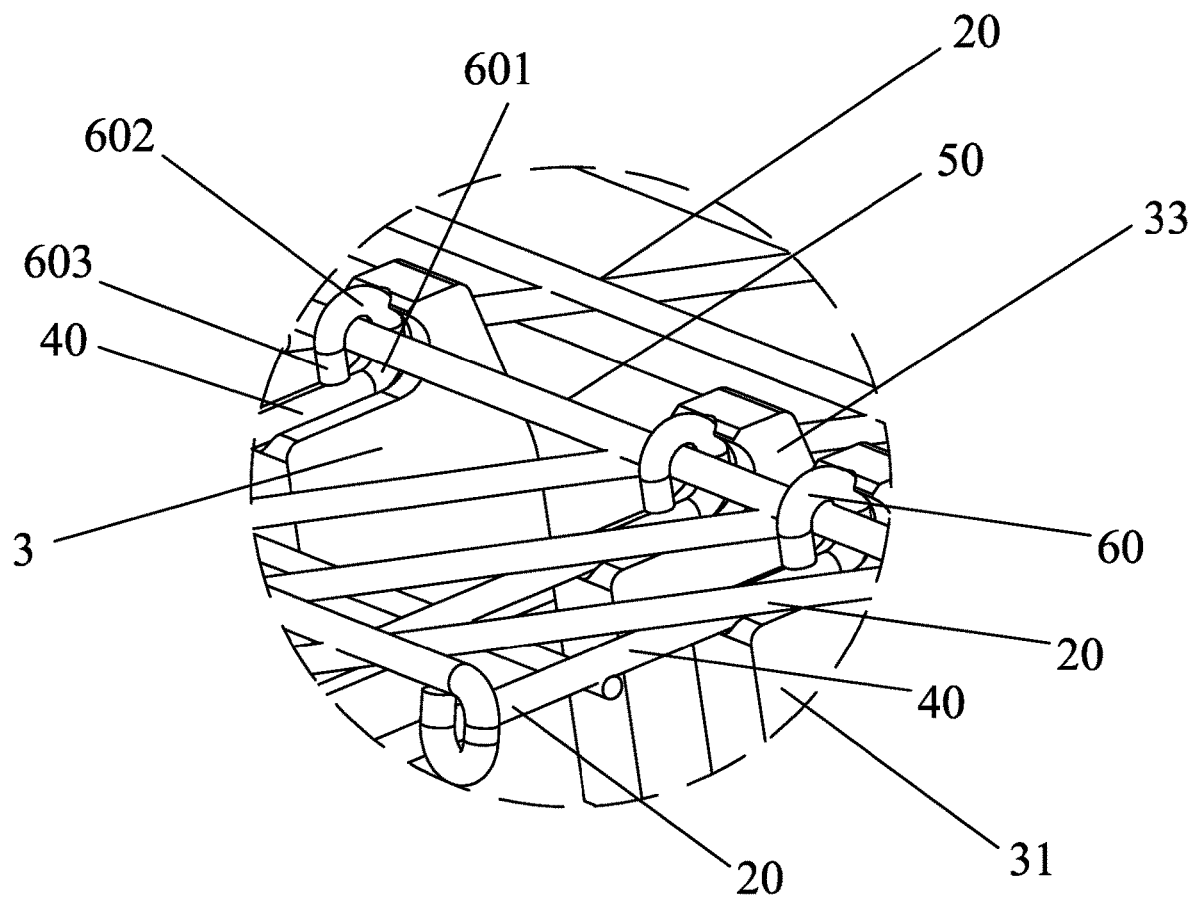
FIG. 8 is an enlarged view of part VIII of FIG. 7.

As shown in FIG. 8, the swivel hook 60 comprises a front section 601, a middle section 602, and a rear section 603, all of which encircle the horizontal rod 50 of the second lateral part 20. When using the device for manufacturing the pet cage, the angle between the rear section 603 and the vertical rod 40 of the first lateral part 10 is 90°. Thus, the gap between the swivel hook 60 and the horizontal rod 50 is reduced, and the vertical rod 40 of the first lateral part 10 is enabled to encircle the horizontal rod 50 of the second lateral part 20 with shorter length. The material cost is decreased, and the pet cage has good appearance.

Figure 4:
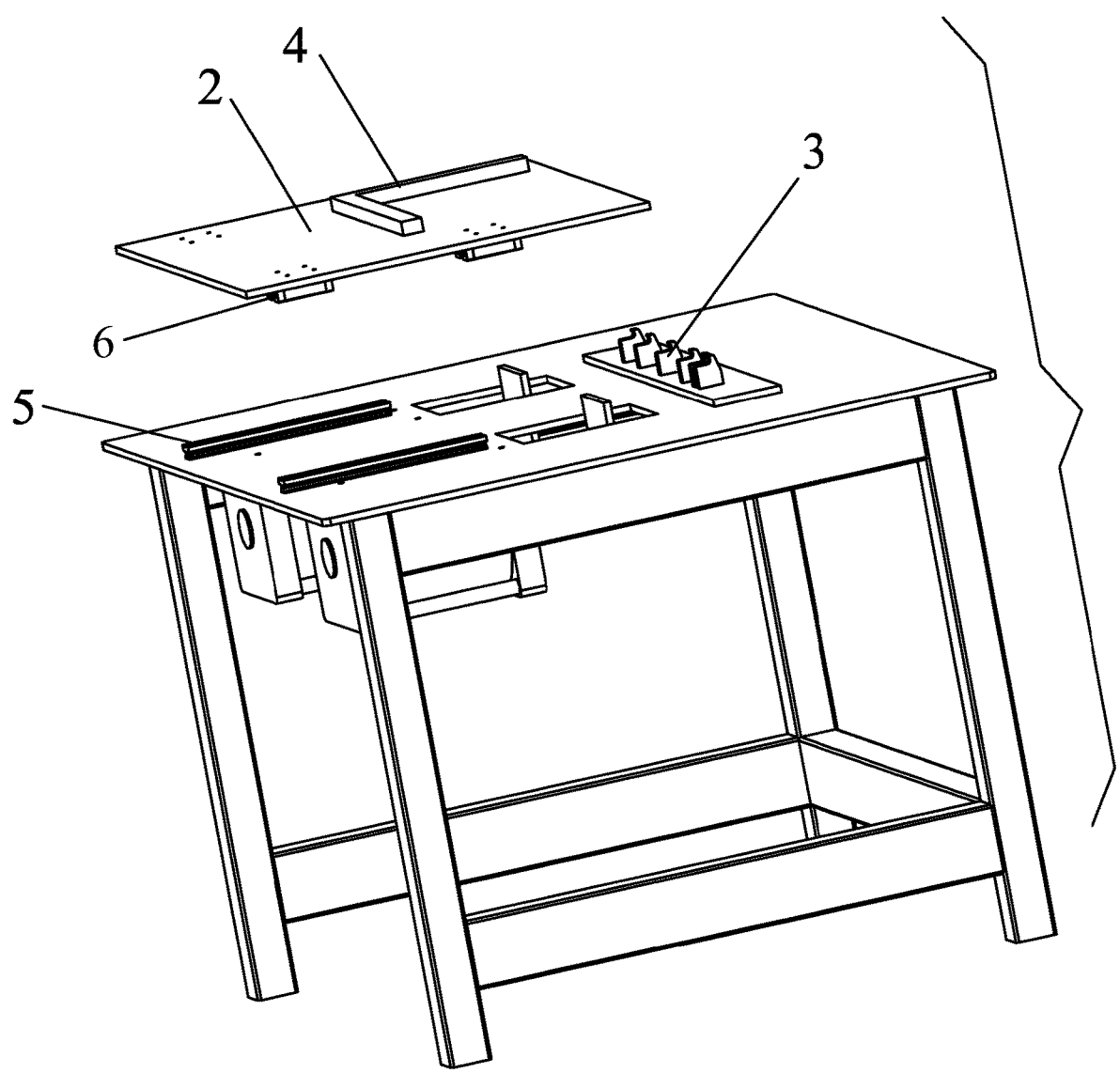
FIG. 4 is an exploded view of a device for manufacturing a pet cage in accordance with one embodiment of the invention.

As shown in FIG. 4, sliding rails 5 are disposed on the frame 1. The sliding table 2 is provided with sliding grooves (not shown in FIGS.) matching with the sliding rails 5. By the cooperation of the sliding rails 5 and the sliding grooves, the sliding of the sliding table 2 is much stable.

Figure 5:
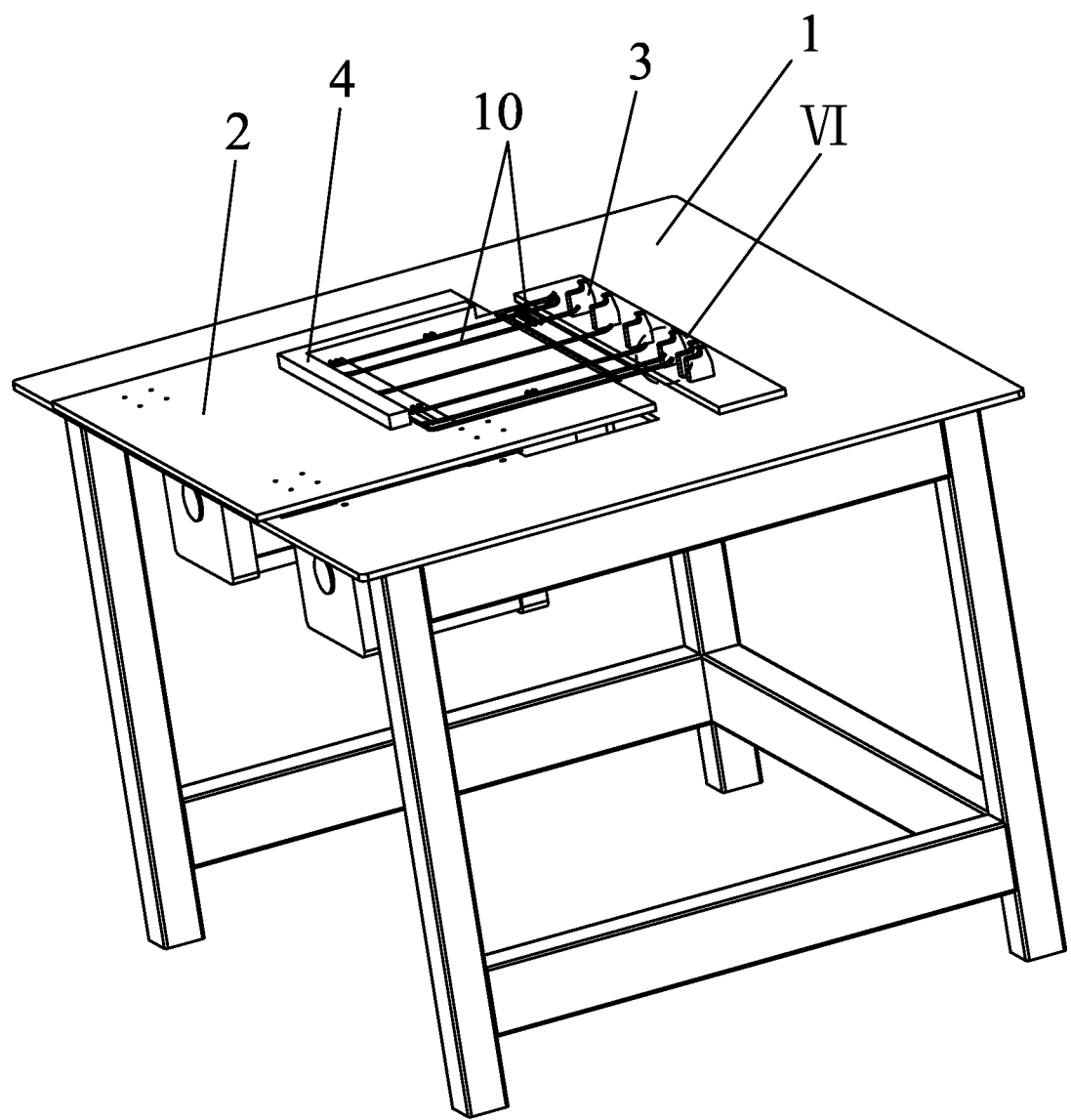
FIG. 5 is a stereogram showing a device for manufacturing a pet cage and a first lateral part.

As shown in FIG. 5, the sliding table is provided with a positioning device 4 for positioning the first lateral part 10.

Figure 1:
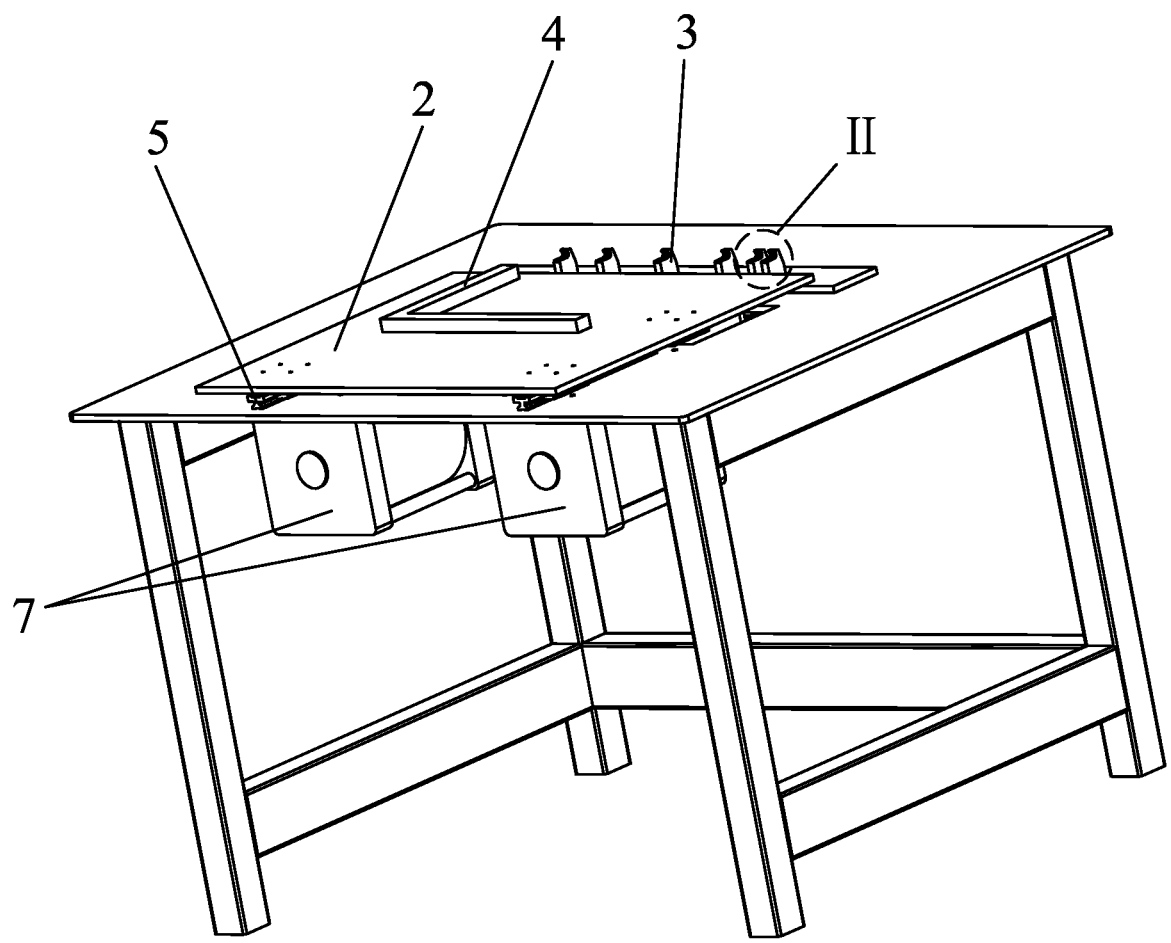
FIG. 1 is a first stereogram of a device for manufacturing a pet cage in accordance with one embodiment of the invention.
Figure 2:
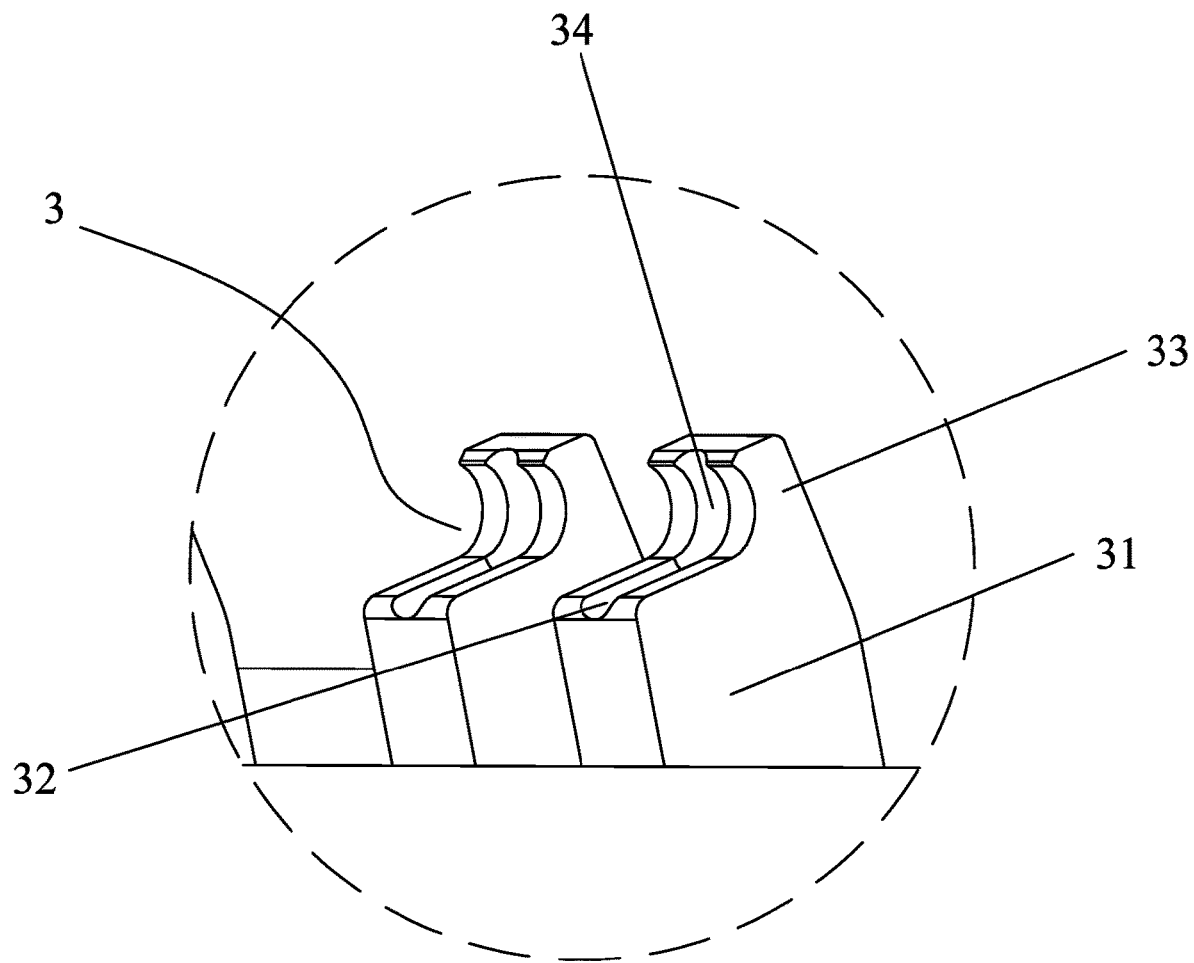
FIG. 2 is an enlarged view of part II of FIG. 1.
Figure 3:
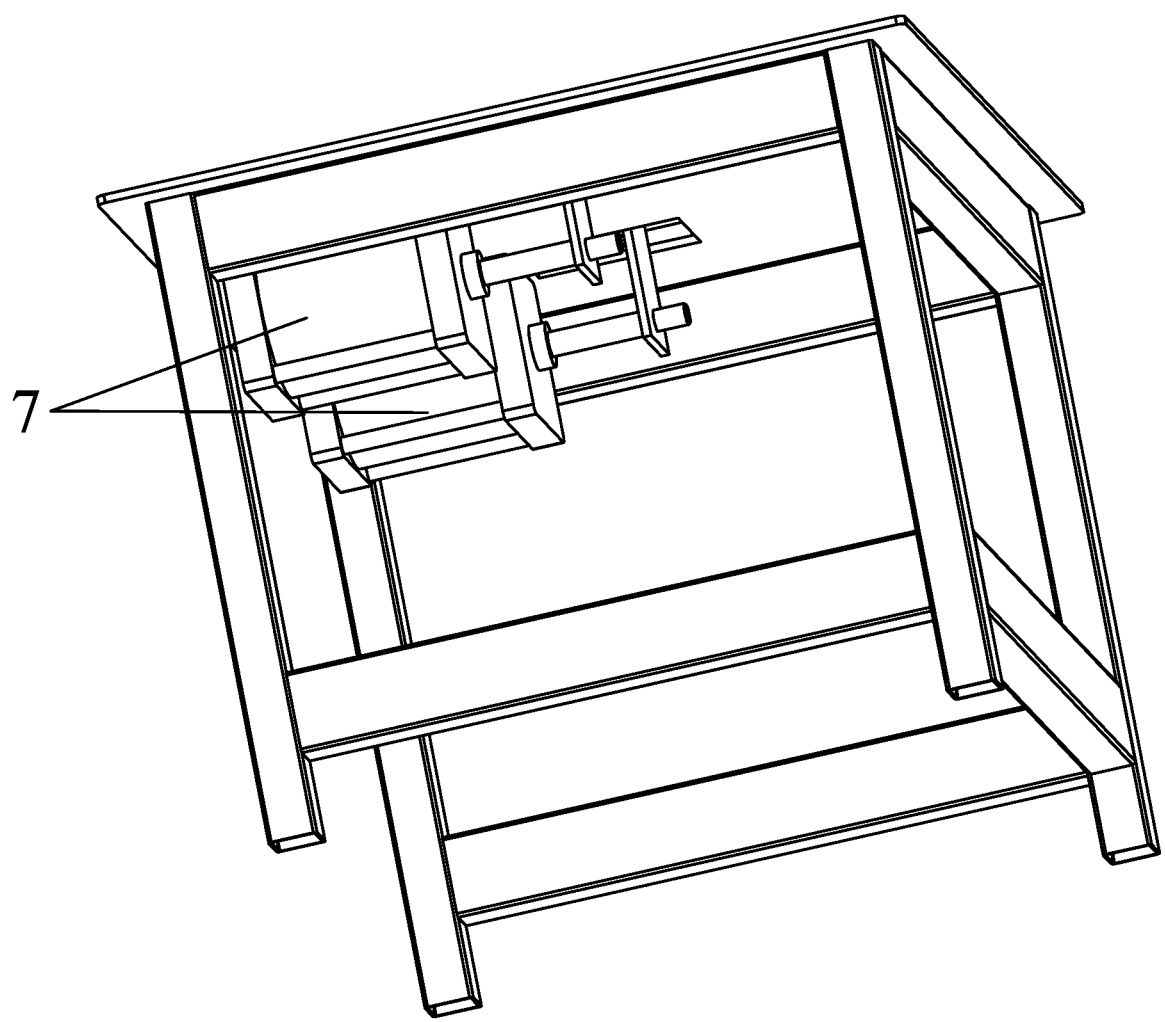
FIG. 3 is a second stereogram of a device for manufacturing a pet cage in accordance with one embodiment of the invention.

As shown in FIG. 2, the boss 31 and the corresponding table body 33 are integrated as a whole.

As shown in FIGS. 5-8, a method for manufacturing a pet cage comprises the following steps:

A) placing a first lateral part 10 on a sliding table 2 of a frame 1 to allow imbedding grooves 32 of the hook modeling platforms 3 to accommodate vertical rods 40 of the first lateral part 10;

B) placing a second lateral part 20 on table bodies 31 of the hook modeling platforms 3 and allowing horizontal rods 50 of the second lateral part 20 to be placed above vertical rods 40 of the first lateral part 40;

C) starting a driving device 7 to allow the sliding table 2 to drive the first lateral part 10 to move forward, during which, an end of each vertical rod 40 of the first lateral part 10 leans against and moves relative to an inner wall of an arc groove 34 of each hook modeling platform 2, whereby bending the end of each vertical rod 40 of the first lateral part 10 to form a swivel hook 60 encircling the horizontal rod 50 of the second lateral part 20 and connecting the first lateral part 10 and the second lateral part 20; and D) disconnecting the driving device 7, allowing the sliding table 2 to recede, and taking out connected first lateral part 10 and second lateral part 20.

The swivel hook 60 encircles the horizontal rod 50 of the second lateral part 20 and comprises: a front section 601, a middle section 602, and a rear section 603. In C), an angle between the rear section 603 and the vertical rod 40 of the first lateral part 10 is 90°.

Figure 6:
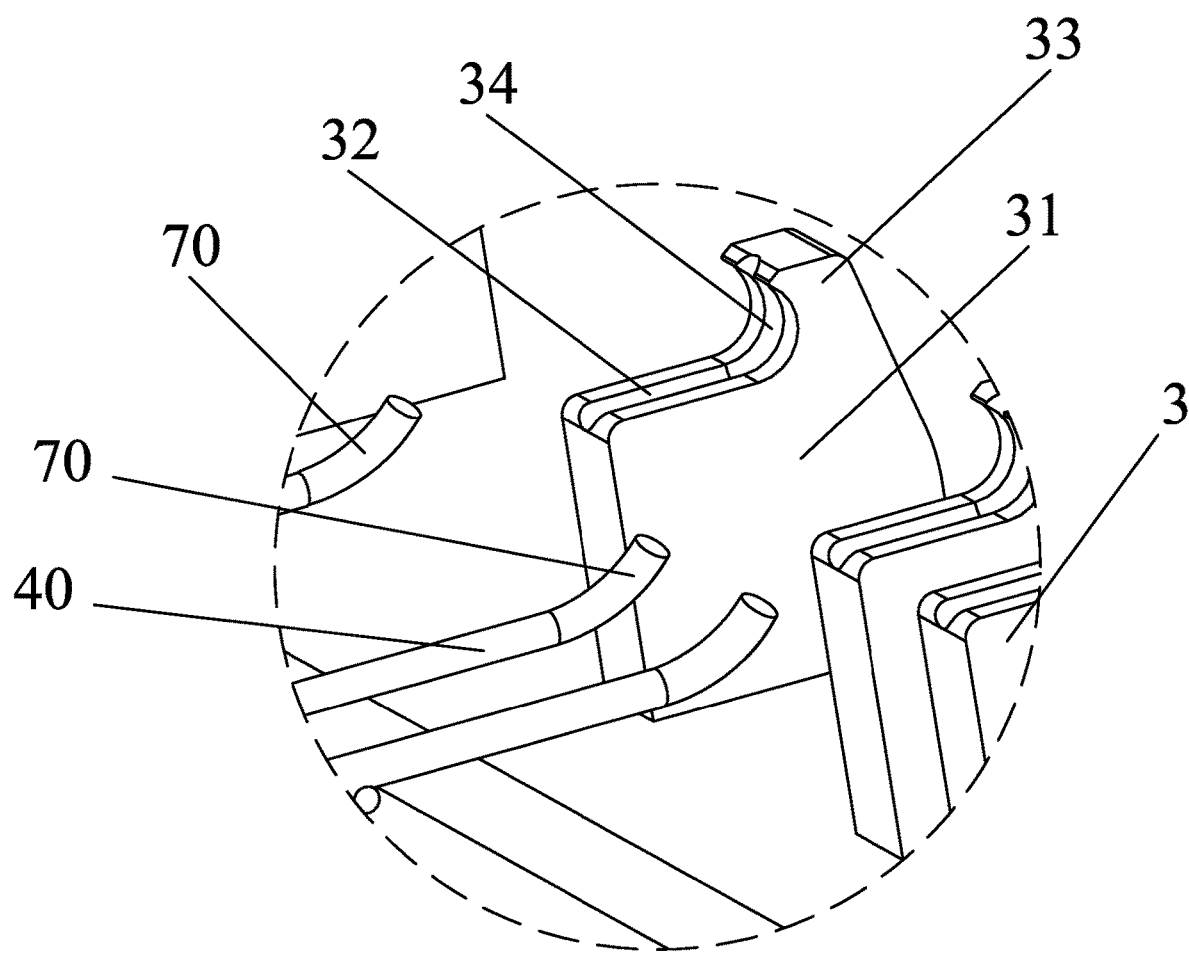
FIG. 6 is an enlarged view of part VI of FIG. 5.
Figure 7:
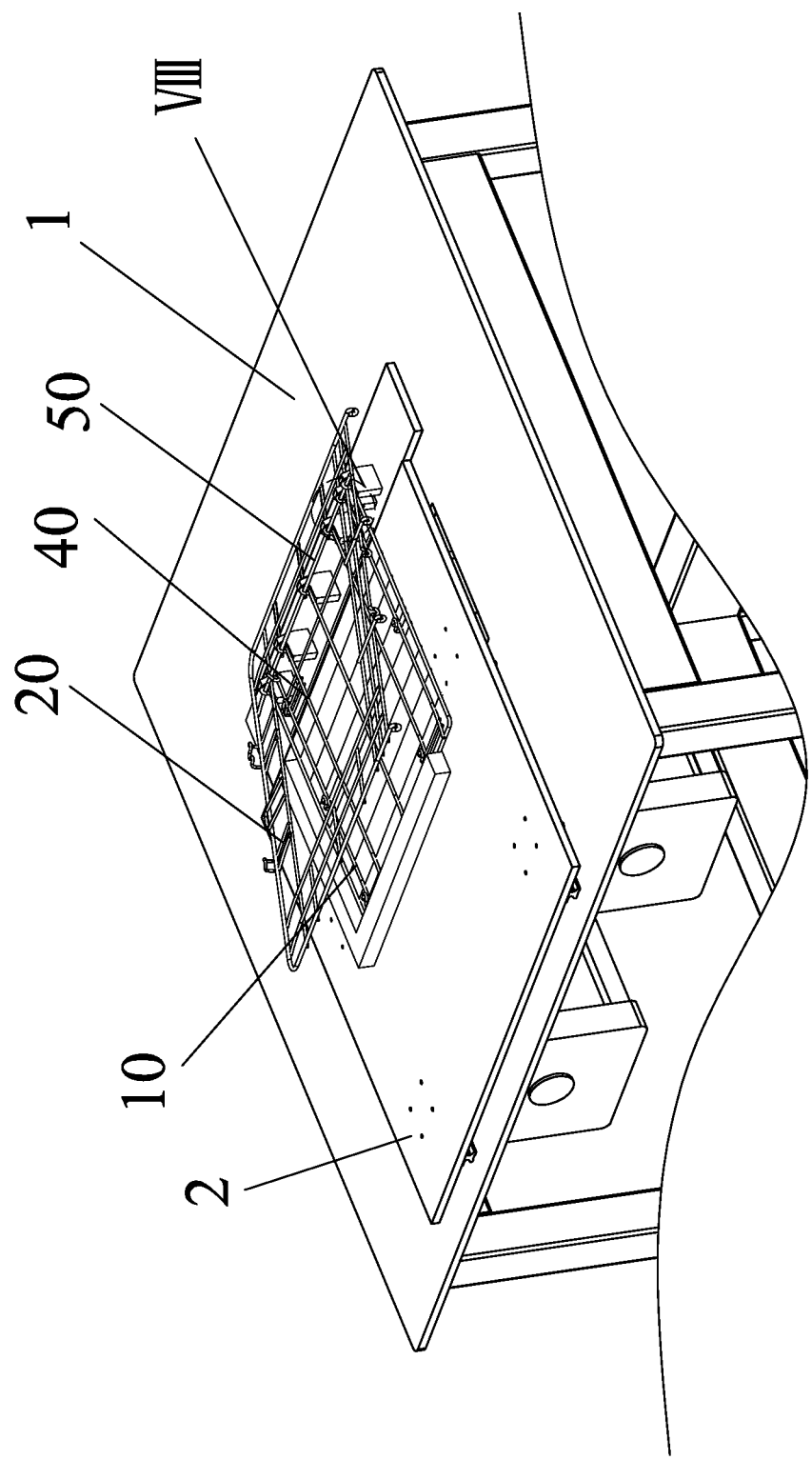
FIG. 7 is a stereogram of a device for manufacturing a pet cage when connecting a first lateral part and a second lateral part.

The method further comprises the following step before A): processing a curved guiding section 70 at the end of each vertical rod 40 of the first lateral part 10. As shown in FIG. 6, because of the curved guiding section 70, it is much easier for the arc groove 34 to bend and deform the end of the vertical rod 40 of the first lateral part 10 into the swivel hook 60 during the forward movement of the first lateral part 10.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A device for manufacturing a pet cage, the device comprising:
   a) a frame;
   b) a plurality of hook modeling platforms, each hook modeling platform comprising: a table body having a surface, an imbedding groove that elongates in a first direction, a boss, and an arc groove formed in the table body, the arc groove concaving into the table body from the surface and having an inner wall; and
   c) a sliding table that slides in the first direction to and from the plurality of hook modeling platforms, wherein the sliding table is slidably disposed on the frame and adapted to support a first lateral part of the pet cage;
   the hook modeling platforms are disposed on the frame;
   each table body is configured to support a horizontal rod of a second lateral part of the pet cage on the surface while allowing the a vertical rod of the first lateral part to slide along the arc groove between the inner wall of the arc groove and the horizontal rod of the second lateral part;
   the imbedding grooves are disposed on table bodies and configured to receive the vertical rod of the first lateral part and are beneath the horizontal rod of the second lateral part;
   each table body protrudes to form the boss; and the arc groove is disposed on each boss and communicates with a corresponding imbedding groove; and
   the arc grooves are adapted to bend the vertical rod of the first lateral part to form a swivel hook encircling the horizontal rod of the second lateral part.

2. The device of claim 1, wherein
   the swivel hook comprises: a front section, a middle section, and a rear section; and
   an angle between the rear section and the vertical rod of the first lateral part is between 80° and 100°.

3. The device of claim 2, wherein the angle between the rear section and the vertical rod of the first lateral part is 90°.

4. The device of claim 1, wherein sliding rails are disposed on the frame; and the sliding table is provided with sliding grooves matching with the sliding rails.

5. The device of claim 2, wherein sliding rails are disposed on the frame; and the sliding table is provided with sliding grooves matching with the sliding rails.

6. The device of claim 3, wherein sliding rails are disposed on the frame; and the sliding table is provided with sliding grooves matching with the sliding rails.

7. The device of claim 1, wherein the boss and the table body are integrated.

8. The device of claim 2, wherein the boss and the table body are integrated.

9. The device of claim 3, wherein the boss and the table body are integrated.

* * * * *